G. T. BUCKHAM.
ELEVATING AND SIGHTING APPARATUS OF FIELD GUNS.
APPLICATION FILED AUG. 20, 1909.
1,013,585.
Patented Jan. 2, 1912.
2 SHEETS—SHEET 1.
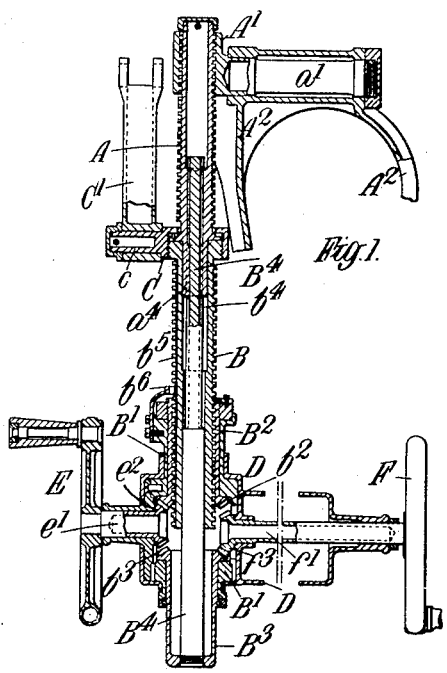

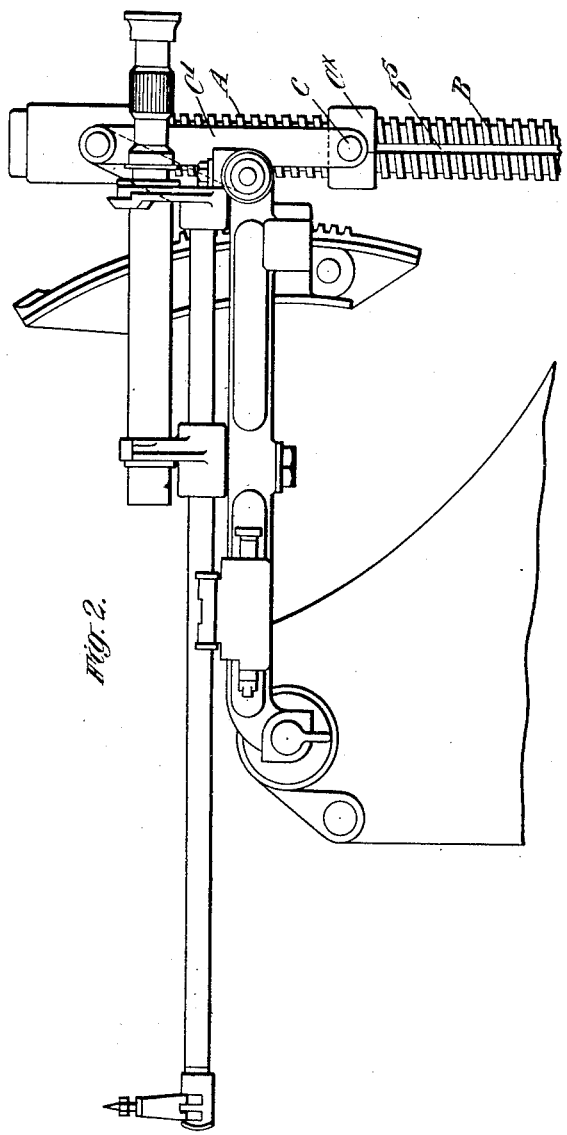

UNITED STATES PATENT OFFICE.

GEORGE THOMAS BUCKHAM, OF WESTMINSTER, LONDON, ENGLAND, ASSIGNOR TO VICKERS SONS & MAXIM, LIMITED, OF LONDON, ENGLAND.

ELEVATING AND SIGHTING APPARATUS OF FIELD-GUNS.

1,013,585. Specification of Letters Patent. Patented Jan. 2, 1912.

Application filed August 20, 1909. Serial No. 513,769.

*To all whom it may concern:*

Be it known that I, GEORGE THOMAS BUCKHAM, a subject of the King of Great Britain, residing at 32 Victoria street, Westminster, in the county of London, England, have invented certain new and useful Improvements in and Relating to the Elevating and Sighting Apparatus of Field-Guns, of which the following is a specification.

This invention relates to elevating and sighting apparatus of the kind in which the gun can be elevated together with the sighting apparatus, or independently thereof, the screws for effecting these pointing and ranging operations being arranged co-axially and the hand wheels operating the same being adapted to be actuated without changing the position of their axes relatively to each other or to the mounting.

According to the present invention the ranging screw whose outer end engages with a nut pivotally attached to the gun cradle, abuts on the pointing screw, and is so connected therewith that the said ranging screw can be rotated independently of the pointing screw without receiving any longitudinal movement, but cannot be displaced longitudinally independently of the pointing screw. This connection comprises a box or casing in which the ranging screw can rotate when actuated by the ranging hand wheel, the said box or casing being adapted to be connected with the sighting apparatus.

In order that my said invention may be clearly understood and readily carried into effect, I will describe the same more fully with reference to the accompanying drawings, in which:—

Figure 1 is a vertical section of my improved ranging and pointing gear in which the ranging and pointing screws are made in two parts; and Fig. 2 is a side elevation of the sighting apparatus employed with said gear.

A is the ranging screw and B is the pointing screw, both of which screws are made hollow. The ranging screw is superimposed above the pointing screw with its axis in alinement therewith. At the part where the two screws abut together I provide a box or casing C which permits the ranging screw to revolve relatively to the pointing screw without becoming disconnected, the said box or casing also serving to carry the pivot pin $c$ for the link or arm $C'$ that is coupled to the hinged sight arm of the sighting apparatus in the usual manner. The upper end of the ranging screw engages with a nut $A'$ having a stem $a'$ by which it is swiveled to the gun cradle $A^2$ so as to be capable of turning about a transverse axis without rotating around the screw A. Near the lower part of the pointing screw B is another box or casing $B'$ pivotally connected with the trail D or other convenient part of the mounting and containing a rotary nut $B^2$ which engages with the threads of the said pointing screw and also containing a rotary sleeve $B^3$ which is situated at a point beneath and independent of the rotary nut. The nut $B^2$ and the sleeve $B^3$ have bevel teeth $b^2$ $b^3$ at their inner ends engaging respectively with a bevel pinion $e^2$ on the spindle $e'$ of the pointing hand wheel E and a bevel pinion $f^3$ on the spindle $f'$ of the ranging hand wheel F. Projecting upward from the said sleeve $B^3$ is a spindle $B^4$ which extends through the pointing screw B and into the ranging screw A with which it engages by means of grooves and feathers $b^4$ $a^4$. The threaded portion of the pointing screw B is slotted longitudinally at $b^5$ to receive a projection $b^6$ on the box or casing $B'$ for preventing the said screw from revolving but permitting it to slide longitudinally. When the pointing hand wheel E is operated the aforesaid nut $B^2$ in the box or casing $B'$ will be revolved, through the intervention of the bevel gearing $e^2$ $b^2$, and the pointing screw B as well as the ranging screw A will move together in a longitudinal direction without turning, thus simultaneously changing the elevation of the gun and sight. When the ranging hand wheel F is operated, the aforesaid sleeve $B^3$ in the box or casing $B'$ will be revolved through the intervention of the bevel gearing $f^3$ $b^3$ appertaining thereto, whereby the ranging screw A will be revolved by means of the internal spindle $B^4$ that extends from the said sleeve $B^3$ and engages with the ranging screw A by the grooves and feathers $a^4$ $b^4$. As the said ranging screw A revolves it will cause the non-rotary nut $A'$ on the gun cradle to move longitudinally along the ranging screw A thus changing the elevation of the gun without moving the sight. It will be seen that in this arrangement the ranging screw A does not extend completely through the pointing screw B as in previous arrangements, but only extends into the same for a sufficient distance to give a steady bearing thereto, motion being transmitted to the ranging screw by the spindle $B^4$ along which the ranging screw can slide. By this arrangement no part of the gear projects below the sleeve $B^3$ at any time during the operation of the said gear. Obviously this arrangement for actuating the ranging screw could be employed with screws situated in a horizontal or approximately horizontal position.

What I claim and desire to secure by Letters Patent of the United States is:—

1. In elevating and sighting apparatus for ordnance, the combination with the trail of the gun and the ranging and pointing hand wheels mounted thereon, of a pointing screw, a ranging screw which abuts thereon and does not pass through said pointing screw, and means for connecting the said screws together located entirely at their abutting parts so that the ranging screw can be rotated independently of the pointing screw without receiving any longitudinal movement, but cannot be displaced longitudinally independently of the pointing screw.

2. In elevating and sighting apparatus for ordnance, the combination with the trail of the gun and the ranging and pointing hand wheels mounted thereon, of a nut pivotally attached to the gun cradle, a pointing screw, a ranging screw which passes through said nut and which abuts on said pointing screw and does not pass therethrough, and means for connecting the said screws together located entirely at their abutting parts so that the ranging screw can be rotated independently of the pointing screw without receiving any longitudinal movement, but cannot be displaced longitudinally independently of the pointing screw.

3. In elevating and sighting apparatus for ordnance, the combination with the trail of the gun and the ranging and pointing hand wheels mounted thereon, of a nut pivotally attached to the gun cradle, a pointing screw, a ranging screw which passes through said nut and which abuts on said pointing screw and does not pass therethrough, a rotary sleeve connected with the ranging screw and actuated by said ranging hand wheel, and means for connecting the said screws together located entirely at their abutting parts so that the ranging screw can be rotated independently of the pointing screw without receiving any longitudinal movement, but cannot be displaced longitudinally independently of the pointing screw.

4. In elevating and sighting apparatus for ordnance, the combination with the trail of the gun and the ranging and pointing hand wheels mounted thereon, of a nut pivotally attached to the gun cradle, a pointing screw, a ranging screw which passes through said nut and which abuts on said pointing screw and does not pass therethrough, a rotary sleeve connected with the ranging screw and actuated by said ranging hand wheel, a rotary nut engaging with the pointing screw and actuated by the pointing hand wheel, and means for connecting the said screws together located entirely at their abutting parts so that the ranging screw can be rotated independently of the pointing screw without receiving any longitudinal movement, but cannot be displaced longitudinally independently of the pointing screw.

5. In elevating and sighting apparatus for ordnance, the combination with the trail of the gun and the ranging and pointing hand wheels mounted thereon, of a nut pivotally attached to the gun cradle, a pointing screw, a ranging screw which passes through said nut and which abuts on said pointing screw and does not pass therethrough, a rotary sleeve connected with the ranging screw, a spindle connecting said rotary sleeve with the ranging screw, a rotary nut engaging with the pointing screw and actuated by the pointing hand wheel, and means for connecting the said screws together located entirely at their abutting parts so that the ranging screw can be rotated independently of the pointing screw without receiving any longitudinal movement, but cannot be displaced longitudinally independently of the pointing screw.

6. In elevating and sighting apparatus for ordnance, the combination with the trail of the gun and the ranging and pointing hand wheels mounted thereon, of a pointing screw, a ranging screw which abuts thereon and does not pass through said pointing screw, and a casing joining the ends of the ranging and pointing screws at their abutting parts so that the ranging screw can revolve relatively to the pointing screw without becoming disconnected.

7. In elevating and sighting apparatus for ordnance, the combination with the trail of the gun and the ranging and pointing hand wheels mounted thereon, of a pointing screw, a ranging screw which abuts thereon and does not pass through said pointing screw, a casing joining the said ranging screw to the pointing screw at their abutting parts, sighting apparatus, and means for connecting said casing to the sighting apparatus.

8. In elevating and sighting apparatus for ordnance, the combination with the trail of the gun and ranging and pointing hand wheels mounted thereon, of a pointing screw, a ranging screw which abuts thereon and does not pass through said pointing screw, a casing attached to the pointing screw, a flange on the ranging screw with which said casing engages, sighting apparatus, and means for connecting said casing to the sighting apparatus.

In testimony whereof I affix my signature in presence of two witnesses.

GEORGE THOMAS BUCKHAM.

Witnesses:
 HENRY KING,
 ERNEST E. LARKINS.

Copies of this patent may be obtained for five cents each, by addressing the "Commissioner of Patents, Washington, D. C."